United States Patent [19]

Abramowitz

[11] 4,106,310

[45] Aug. 15, 1978

[54] PIERCED EARRING DEVICE

[76] Inventor: Herbert Abramowitz, 143-19 25th Ave., Whitestone, N.Y. 11357

[21] Appl. No.: 808,154

[22] Filed: Jun. 20, 1977

[51] Int. Cl.² ............................................. A44C 7/00
[52] U.S. Cl. .......................................... 63/12; 24/108; 24/217 R; 24/237; 63/13; 128/329 R
[58] Field of Search ............... 63/12, 13; 128/329 R; 24/216, 217, 155 BB, 155 R, 237

[56] References Cited

U.S. PATENT DOCUMENTS

| 241,462 | 5/1881 | Washburn | 63/13 |
|---|---|---|---|
| 483,214 | 9/1892 | Gaynor | 63/13 |
| 718,708 | 1/1903 | Geiger et al. | 63/13 |
| 2,691,846 | 10/1954 | Fruhling | 63/13 X |
| 2,739,596 | 3/1956 | Roberts | 63/12 X |
| 3,500,829 | 3/1970 | Abramowitz | 128/329 |
| 3,853,416 | 12/1974 | Hanan | 63/12 X |

FOREIGN PATENT DOCUMENTS

| 47,888 | 7/1889 | Fed. Rep. of Germany | 63/12 |
| 468,364 | 11/1928 | Fed. Rep. of Germany | 63/13 |

Primary Examiner—F. Barry Shay

[57] ABSTRACT

In a preferred embodiment, there is provided an earring having a squared-cross-section post for extending through a pierced earlobe, and having a drainage channel formed in an upper surface thereof extending axially longitudinally of the elongated length of the post, and there being an anchoring structure and mechanism thereof for clamping with a slight twisting pressure onto the fastening-end of the post thereby providing enhanced clamping against accidental disengagement.

4 Claims, 6 Drawing Figures

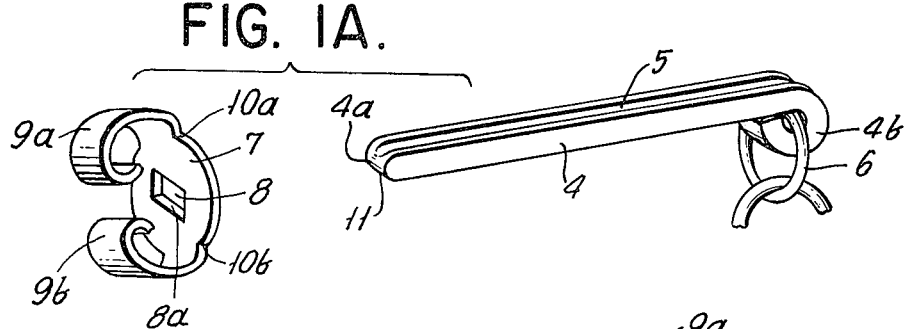
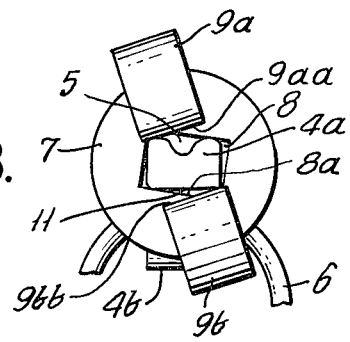
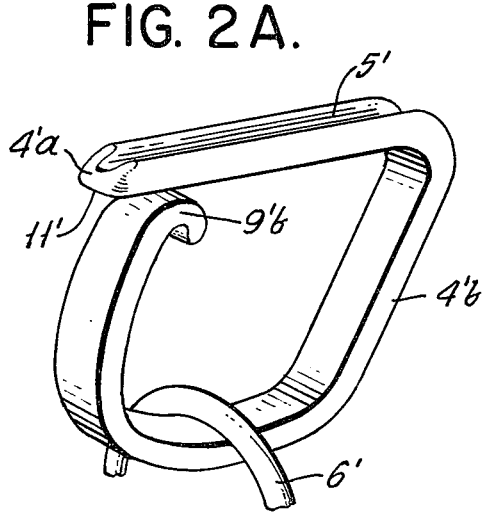
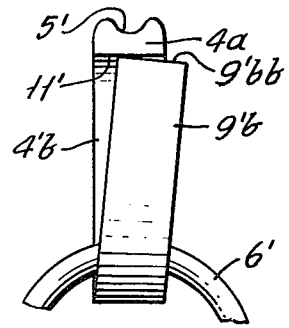
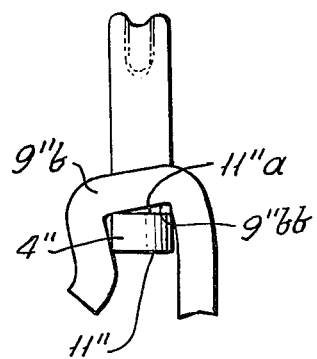
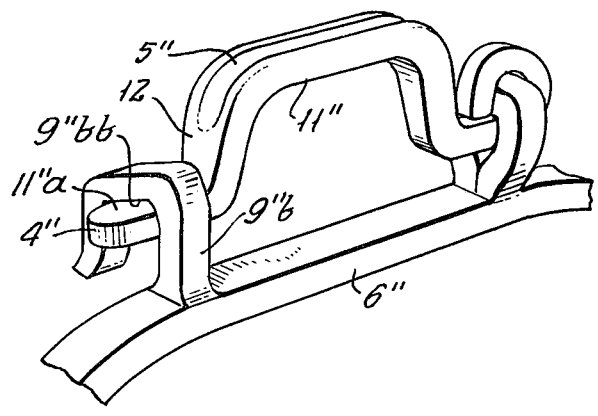

PIERCED EARRING DEVICE

This invention relates to an improved pierced-earlobe earring.

BACKGROUND OF THE INVENTION

Prior to the present invention, the inventor invented and patented a drainage apparatus set-forth in U.S. Pat. No. 3,500,829, patented Mar. 17, 1970. The present invention is more directed to a functional earring and problems associated therewith, in the avoiding of and correcting of irritations of pierced earlobes, rings or posts extending therethrough being notoriously known to cause major problems with regard to one or more of allergies and sharp edges pressing downwardly, the weighty earrings causing the post to tear-downwardly into the flesh, particularly with the larger type earrings and ornaments thereof. While it is advantageous not being constantly threatened with the loss of an earring by accidental disengagement of the locking mechanism thereof and the pulling-out of the post and following loss of the earring on many occasions, it is further desirable from the health and safety standpoint to have a firmly secured post to thereby prevent shifting of the earring post within the earlobe. Also, whenever a post is accidentally withdrawn and thereupon not carefully withdrawn, there is substantially increased danger of cutting the earlobe flesh with the end of the post being withdrawn.

In addition, it is desirable to maintain a healthy state of an earlobe by both improving support of the earring post in the earlobe-mounted state, and concurrently provide for drainage and airing space to the interior of the hole of the pierced earlobe during the wearing of the earring.

SUMMARY OF THE INVENTION

Accordingly, objects of the present invention are to avoid problems of the types discussed above, and obtain novel benefits of the types discussed above, together with other novel advantages.

Another object is to obtain one and more of these objects while maintaining competitively low costs, making possible the healthful earring posts and earrings thereof of this invention to even those of the lowest income who desire safe and ornamental adornment.

Other objects become apparent from the preceding and following disclosure.

One or more objects of the invention are obtained by the embodiments illustrated in the Figures which however are not necessarily limiting of the invention to merely those embodiment illustrated principally for improving understanding of the invention and for illustrating preferred embodiments and features.

Broadly the invention may be defined as an earring device including at-least an elongated post of which a lower side thereof along the axial longitudinal axis thereof is substantially flat, i.e., a planar surface, with necessary structure at one end thereof structured and adapted to include or for attaching thereto and the supporting of ornament-like fixtures, either directly or indirectly, as the case may be. The ornaments may be permanently attached, or detachable, this not being the essence of the invention. The function of the planar surface is to provide a broad surface area downwardly facing when the post is positioned in a supporting (of ornaments) state and position, such that supporting pressure on the earlobe flesh therebeneath is not concentrated at any one point, but is evenly distributed over the entire broad area. This avoids cutting pressures that normally occur from either sharp or small-rounded sides of posts exerting downward pressure as a result of the weight of the earring major body-portion and/or ornamental structure or fixtures (collectively speaking).

At the same time, the squared or at least flat-sided (as above-described) post, preferably of squared cross-section, serves as a handle at the anchoring (fastening) end thereof for a preferred twisting engagement with a clamp fastening thereonto in a slightly non-aligned state. The structure in order to impart a twist, must be provided with a base against which to twist. This is typically accomplished by two alternate mechanisms. In one, the clamping (anchoring) structure is fixedly directly or indirectly connected to the ornament-mounting end of the post, whereby relative to the post, the clamping structure may have a fastening post-end-receiving hole or space substantially corresponding to the cross-sectional shape of the post, or at least to one of the flat (planar) surfaces or the like, such that in a predetermined non-aligned, i.e. non-parallel clamping pressure-position, the pressure thereof (tending to turn the post flat surface to a parallel position) serves to put a slight twisting pressure on the post fastening end. It is immaterial whether or not the post actually twists, the twisting pressure thereof serving to more effectively bind the post-end in a secured state secure against accidental disengagement. In an alternate other embodiment, the anchoring structure itself may be separate from the remainder of the post and ornamental structure and the like, and may have typically an aperature-forming structure receivable of the particular shape of the cross-section of the post, and additionally the anchoring structure include a clamping surface (one or more) in which a flat face is in non-alignment with each of the corresponding flat edge of the aperature and the flat/planar surface of the post, whereby one portion of the post is held in a given position while another portion thereof is subjected to a twisting pressure of the clamping surface. The structure of the clamping surface is fixedly positioned relative to the aperature-forming structure, one being fixedly connected to the other to maintain that position, with a resulting better or improved grasping of the post end than has been heretofore available.

As another preferred feature of the invention, there is provided a permanent drainage channel in a remaining portion of the surface of the post, the flat face being positioned downwardly and the drainage channel by virtue of the drain recess or slot, being preferably along an upper face of the post and extending axially longitudinally along the length of the post at-least from a central or mid-length location of the post toward one or the other or both ends, at least partially toward one or the other ends thereof, sufficiently that any liquid drainage matter may flow along the channel to avoid greater possibility of infection or the like, as well as to provide aeration to the tissues of flesh within the aperature of the pierced ear. The recess is preferably at the top side because of least pressure at that point, and the edges of the recess structure also thereby would have lesser tendency to bite-into the flesh, as well as at that point of lesser pressure, there being the least possible tendency for earlobe flesh to become pressed into the recess space of the recess, groove or channel — whatever it may be desirably termed. The improved clamping mechanism above-described, makes possible the firm-fastening against opposite faces of the earlobe in order to facilitate the maintaining of the post in the correct spacial positioning, with the flattened (planar) surface facing downwardly and the drainage channel being positioned to face upwardly preferably.

The invention may be better understood by making reference to the following Figures.

THE FIGURES

FIG. 1A illustrates in side perspective and exploded view, a typical embodiment of the present invention, disclosing the lineally extending post with upper groove and lower flat face, with attached ornament fixtures shown in in-part view and the clamping mechanism.

FIG. 1B illustrates the same embodiment as FIG. 1A, except end view thereof in non-exploded state.

FIG. 2A illustrates an alternate embodiment in which the clamping mechanism is integral with the post, with ornament fixture mounted thereon shown in in-part view, the overall Figure again being side perspective.

FIG. 2B, again, is an end view, this one of FIG. 2A embodiment.

FIG. 3A is a further alternate embodiment in side perspective view, again the clamping mechanism being a part of the ornament support or ornament structure shown in in-part view, and again the FIG. 3B being an end view, in in-part view.

DETAILED DESCRIPTION

It must be understood, that while the post material is preferably of stainless steel, the post as well as other component parts of the earring may be of other metal(s) in part or in whole, and/or of plastic or the like, in part or in whole. Stainless steel is preferred because of the safety thereof in the prevention of allergies and/or infections.

Also, while only a minor few example of earring structures have been illustrated in the Figures, it is to be understood that this invention obviously applies equally to earrings of other diverse designs and shapes, so long as such are not in conflict with express objects of the present invention. For example, most earrings have an ornament molded or otherwise firmly and immovably mounted on the end of the post itself, rather than dangling (the mechanism illustrated), and accordingly such type ornament mountings obviously are contemplated as alternate probable designs.

With regard to the particular Figures, FIGS. 1A and 1B illustrate a first embodiment, of preferred type structure in so far as the post and clamping mechanims are each concerned. FIGS. 2A and 2B illustrate a second embodiment, and FIGS. 3A and 3B illustrate a third embodiment. In all embodiments, common indicia are utilized for substantially common elements, with the FIG. 2 embodiment being noted as primes, and the FIG. 3 embodiment being noted as double-primed indicia. Accordingly, indicia explanations shall not be repeated in every instance for each embodiment or view thereof.

In FIG. 1A and 1B, the post 4 includes the ornament-mounting end 4b and the clamping end 4a, with the upper recess (groove) 5. Ornament fixture (or fixture support) 6 is also shown in the mounted state on the mounting post end 4b. Clamping disk-element 7 has squared aperature 8 with the squared sides 8a thereof and aperature formed thereby in an off-set relationship to the positions 10a and 10b from which the clamping spring members 9a and 9b extend, such that as shown in the FIG. 1B view, the clamping members 9a and 9b each tend to twist the post 4 within the hole (aperature) 8, as shown; thereby the clamping-action is enhanced, reducing the possibility of the disk-element 7 from slipping-off of the end 4a. It will be noted that the clamping spring member 9b presses against the flat-bottom (planar) face 11 of the post 5; in the off-set alignment, the post thus has a twisting pressure imparted thereto it.

In the like manner the clamping spring member 9'b, preferably made out of spring-steel, presses, in non-alignment, against the flat-bottom (planar) face 11'.

The FIGS. 3A and 3B embodiment differs, in that the squared end 4" has the flat-top face 11"a with the straight and flat-surface 9"bb of clamping spring member 9"b, pressing thereagainst, and also the lower-left and upper-right corners (in the view as illustrated) of the post end 4" are pressured further into the twisted position, by contacting portions of the clamping spring member 9"b, as shown.

In each of the embodiment of FIGS. 2A and 3A respectively, the ornamental fixtures 6' and 6" are shown-in-part ornamental rings, or alternately support structure for other types of ornamentation, as might be desired.

It is within the scope of the invention to make such variations as might be required or desired by ordinary artisans in this art, having skill therein.

I claim:

1. An earring device comprising in combination: an elongated post having at-least one side thereof extending as a planar surface along an axis transversely of a longitudinal axis of the elongated post, further having ornament-attaching means at one end thereof for the supporting of an ornament thereon, and an opposite remaining end of the elongated post being of a shape adapted to be fastened to an anchoring element, adapted such that when mounted in a pierced ear said one side's planar surface faces downwardly thereby providing optimally maximum surface area, and earring post-locking means for detachable securement to said opposite remaining end, comprising said anchoring element, adapted for preventing withdrawal of the elongated post from a pierced earlobe when the earring post-locking means is attached, said earring postlocking means including receptacle structure forming and providing a space receivable of said opposite remaining end therein and space-defining walls of said space being shaped such that a cross-section of the space is of a shape and size substantially the same as a cross-section transversely through said elongated post, and the earring post-locking means further including a clamping means attached to and mounted in fixed spacial relationship to said receptacle structure and the space thereof, and the clamping means including at-least one clamping surface extending in a manner and positioned such that, when in a clamping state, the clamping surface presses against said one side's planar surface in a non-parallel relationship thereto whereby a slight twist is imparted to said post relative to said earring post-locking means such that the anchoring thereof is improved against potential accidental unfastening.

2. An earring device of claim 1, in which a recess is formed in and extends axially-longitudinally along a remaining portion of surface other than said one side thereby providing a drainage channel along a surface which when in a mounted state within a pierced earlobe is subjected to less flesh-pressure than the one side is subjected to whereby drainage when needed is facilitated for a person wearing the elongated post.

3. An earring device of claim 2, including ornamental fixture-structure fixedly attached to said one end thereby providing an ornamental earring.

4. An earring device of claim 2, in which said elongated post's cross-section is substantially squared at least along axially extending portions thereof normally in contact with earlobe flesh when the elongated post is in a mounted state within a pierced earlobe.

* * * * *